US012660072B2

(12) United States Patent
Huang et al.

(10) Patent No.: US 12,660,072 B2
(45) Date of Patent: Jun. 16, 2026

(54) AUTOMATIC EXPOSURE CONTROL METHOD AND SYSTEM FOR X-RAY

(71) Applicant: IRAY TECHNOLOGY COMPANY LIMITED, Shanghai (CN)

(72) Inventors: Yimin Huang, Shanghai (CN); Chenglin He, Shanghai (CN)

(73) Assignee: IRAY TECHNOLOGY COMPANY LIMITED, Shanghai (CN)

( * ) Notice: Subject to any disclaimer, the term of this patent is extended or adjusted under 35 U.S.C. 154(b) by 402 days.

(21) Appl. No.: 18/269,281

(22) PCT Filed: Jul. 8, 2021

(86) PCT No.: PCT/CN2021/105256

§ 371 (c)(1),
(2) Date: Jan. 15, 2024

(87) PCT Pub. No.: WO2022/134542

PCT Pub. Date: Jun. 30, 2022

(65) Prior Publication Data

US 2024/0334583 A1 Oct. 3, 2024

(30) Foreign Application Priority Data

Dec. 23, 2020 (CN) ......................... 202011532509.2

(51) Int. Cl.
*H05G 1/42* (2006.01)

(52) U.S. Cl.
CPC .................................... *H05G 1/42* (2013.01)

(58) Field of Classification Search
CPC ... H05G 1/42; H05G 1/30; H05G 1/44; G01T 1/161
See application file for complete search history.

(56) References Cited

U.S. PATENT DOCUMENTS

2007/0297569 A1 12/2007 Saunders
2013/0223592 A1* 8/2013 Sato ....................... H04N 25/30 378/97
2015/0078528 A1* 3/2015 Okada .................... A61B 6/542 378/97

FOREIGN PATENT DOCUMENTS

CN 103156625 A 6/2013
CN 103284736 A 9/2013
(Continued)

*Primary Examiner* — Jurie Yun
(74) *Attorney, Agent, or Firm* — IPRTOP LLC

(57) ABSTRACT

An automatic X-ray exposure control method and system are disclosed. The method comprises: turning on a flat-panel detector, setting parameters of the flat-panel detector, and selecting one or more exposure radiation fields of the flat-panel detector; testing a corresponding exposure dose obtained by scanning the exposure radiation fields in real time, and determining that an exposure has started when the tested exposure dose is greater than a first preset threshold; configuring the flat-panel detector such that it enters an automatic exposure control mode when the exposure is started and triggers a cut-off signal; configuring the flat-panel detector such that it triggers an image acquisition when the exposure is completed. The present disclosed method and system can simplify the structure, reduce the cost, and effectively avoid exposure dose errors caused by line delays and other problems. Meanwhile, it also shortens the image acquisition cycle and reduces the complexity of operation.

14 Claims, 3 Drawing Sheets

(56) References Cited

FOREIGN PATENT DOCUMENTS

| | | | |
|---|---|---|---|
| CN | 104220000 | A | 12/2014 |
| CN | 104427937 | A | 3/2015 |
| CN | 112312636 | A | 2/2021 |
| CN | 112672068 | A | 4/2021 |
| CN | 112690811 | A | 4/2021 |
| CN | 112738391 | A | 4/2021 |
| JP | 2008086358 | A | 4/2008 |
| JP | 2019058208 | A | 4/2019 |

* cited by examiner

AUTOMATIC EXPOSURE CONTROL METHOD AND SYSTEM FOR X-RAY

FIELD OF THE INVENTION

The present disclosure relates to flat-panel detector, and particularly to an automatic X-ray exposure control method and system.

BACKGROUND OF THE INVENTION

Currently, traditional automatic exposure control (AEC) devices utilize an ionization chamber (mainly two types: gas-state ionization chamber and solid-state ionization chamber) to test the exposure dose. The ionization chamber is set on a surface of a flat-panel detector, and needs to be connected to a high-voltage generator through dedicated cables, thereby leading to a complex structure and an increase in cost. In recent years, integrated digital automatic exposure control has been introduced as an emerging technology in the field, which has reduced the complexity of the system structure and material costs. However, external trigger signals are still needed to start the detection function of integrated digital automatic exposure control, so its structural complexity and cost are still high, and the dependence on external trigger signals is also high. Moreover, its exposure dose errors are relatively large, which has a great impact on the imaging quality.

Therefore, how to lower the dependence on external trigger signals, simplify the structure, and reduce the cost while minimizing the exposure dosage errors has become an urgent problem to be solved by the technical personnel in the field.

SUMMARY OF THE INVENTION

An automatic X-ray exposure control method and system of the present disclosure are provided, which solve the problems of high dependence on external trigger signals, high cost, complex structure, and large exposure dosage errors of automatic exposure control in the related technologies.

The automatic X-ray exposure control method comprises:

- turning on a flat-panel detector, setting parameters of the flat-panel detector, and selecting one or more exposure radiation fields of the flat-panel detector;
- testing a corresponding exposure dose obtained by scanning the exposure radiation fields of the flat-panel detector in real time, and determining that an exposure has started in response to determining the tested exposure dose is greater than a first preset threshold;
- configuring the flat-panel detector such that it enters an automatic exposure control mode in response to determining the exposure is started and triggers a cut-off signal;
- configuring the flat-panel detector such that it triggers an image acquisition in response to determining the exposure is completed;
- wherein the first preset threshold is greater than or equal to zero.

Optionally, the exposure radiation fields adopt an N-fields AEC mode or a full-panel AEC mode, wherein N is a natural number.

Optionally, the flat-panel detector tests an exposure dose rate, determines the corresponding exposure dose in real time, and triggers a cut-off signal in response to determining the exposure dose reaches an exposure dose threshold.

Optionally, the flat-panel detector tests the exposure dose rate, predicts the corresponding exposure dose at the end of the exposure to obtain a predicted exposure dose, and triggers the cut-off signal in response to determining the predicted exposure dose reaches the exposure dose threshold.

Optionally, the flat-panel detector predicts the corresponding exposure dose by predicting the corresponding exposure dose during exposure based on the exposure dose rate and a delay duration of a signal transmission, wherein the exposure dose rate and the delay duration are related to the corresponding exposure dose at the time of cut-off signal is sent.

Optionally, the automatic X-ray exposure control method further comprises: when the exposure radiation fields comprise two or more exposure radiation fields, determining, based on a logical relationship between the exposure radiation fields, whether the flat-panel detector sends out the cut-off signal.

Optionally, the logical relationship adopts an AND logic, an OR logic, a weighted average, etc.

Optionally, testing the corresponding exposure dose rate obtained by scanning the exposure radiation fields of the flat-panel detector in real time, and determining that the exposure is completed in response to determining the tested exposure dose rate is less than a second preset threshold, wherein the second preset threshold is greater than zero.

The automatic X-ray exposure control system, implementing the above-mentioned automatic X-ray exposure control method, comprises:

- a flat-panel detector, a high-voltage controller connected to an output terminal of the flat-panel detector, a high-voltage generator device connected to an output terminal of the high-voltage controller, and a bulb connected to an output terminal of the high-voltage generator device;
- wherein the flat-panel detector comprises a detecting panel, an automatic exposure testing module, and an automatic exposure control module, wherein the detecting panel tests X-rays and converts X-rays into electrical signals, wherein the automatic exposure testing module is connected to an output terminal of the detecting panel, and
- determines a start and end of an exposure based on an output signal of the detecting panel, wherein the automatic exposure control module is connected to output terminals of the detecting panel and the automatic exposure testing module respectively, and triggers a cut-off signal based on the output signal of the detecting panel, wherein the high-voltage controller cuts off the high-voltage generator device based on the cut-off signal, so that the bulb stops emitting X-rays.

Optionally, the automatic exposure control module comprises a testing unit and a logical comparison unit, wherein the testing unit determines, based on the exposure dose rate, the corresponding exposure dose in real time, wherein the logical comparison unit is connected to an output terminal of the testing unit, and triggers the cut-off signal in response to determining the corresponding exposure dose reaches an exposure dose threshold.

Optionally, the automatic exposure control module comprises a testing unit and a logical comparison unit, wherein the testing unit predicts, based on the exposure dose rate and a delay duration of a signal transmission, the corresponding exposure dose at the end of the exposure to obtain a predicted exposure dose, wherein the logical comparison unit is connected to an output terminal of the testing unit, and triggers the cut-off signal in response to determining the predicted exposure dose reaches an exposure dose threshold.

Optionally, when the exposure radiation fields comprise two or more exposure radiation fields, the testing unit tests each of the exposure radiation fields respectively, wherein the logical comparison unit performs logic operations and comparison operations on an output signal of the testing unit, and triggers the cut-off signal.

As described above, the present disclosure has the following advantages:

1. The present disclosed automatic X-ray exposure control method and system achieve, based on the corresponding exposure dose obtained by scanning the exposure radiation fields of the flat-panel detector, automatic exposure testing without relying on external trigger signals or a sensor, resulting in a simpler structure and lower cost.

2. The present disclosed automatic X-ray exposure control method and system predict the exposure dose during the exposure through an algorithm, which effectively avoids exposure dose errors caused by line delays and other problems, enabling accurate exposure control and improved imaging quality.

3. The present disclosed automatic X-ray exposure control method and system trigger automatic image acquisition as soon as the exposure is completed, thereby shortening the image acquisition cycle of the flat-panel detector.

4. The present disclosed automatic X-ray exposure control method and system only require the operator to start the high-voltage generator throughout the exposure and image acquisition, greatly reducing the complexity of operation.

5. Wireless AEC is realized.

REFERENCE NUMERALS

1—Automatic X—ray exposure control system; 11—Flat—panel detector; 111—Detecting panel; 111*a*—Anti—back—scattering layer; 111*b*—Substrate; 111*c*—Pixel array; 111*d*—Scintillator; 112—Automatic exposure testing module; 113—Automatic exposure control module; 113*a*—Testing unit; 113*b*—Logical comparison unit; 12—High—voltage controller; 13—High-voltage generator device; 14—Bulb.

DETAILED DESCRIPTION OF THE INVENTION

The embodiments of the present disclosure will be described below. Those skilled can easily understand disclosure advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Please refer to FIGS. 1 to 4. It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the components' layout may also be more complicated.

Embodiment 1

Figure 1:
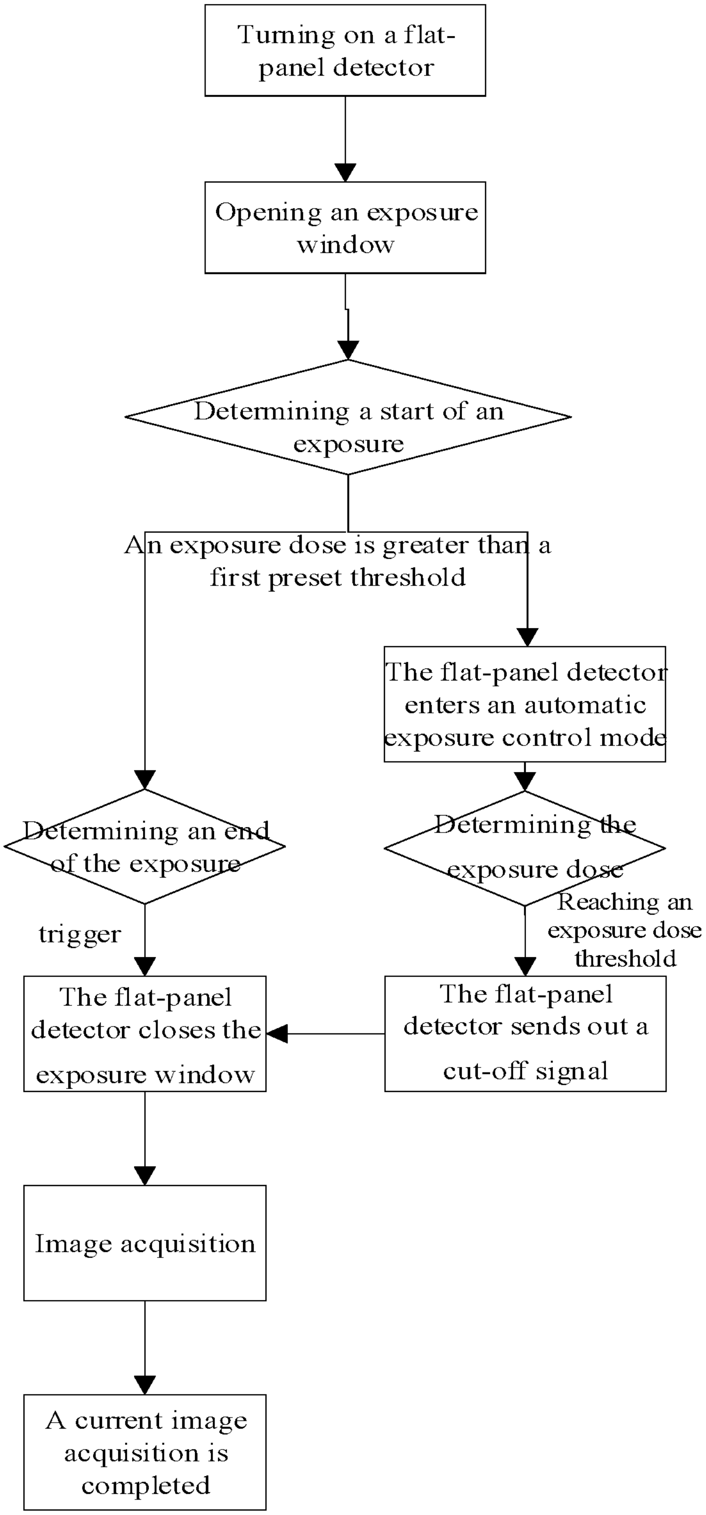
FIG. 1 shows a flow chart of an automatic X-ray exposure control method according to the present disclosure.

As shown in FIG. 1, the present disclosure provides an automatic X-ray exposure control method, comprising steps 1-4:

Step 1: turning on a flat-panel detector, setting parameters of the flat-panel detector, and selecting one or more exposure radiation fields of the flat-panel detector.

Specifically, the flat-panel detector is first placed in a detecting system and electrically connected to other devices in the detecting system. The detecting system may include digital radiography (DR), computed tomography (CT), security inspection machines, and any other system that utilizes a flat-panel detector for image acquisition.

Specifically, the parameters to be set may include an exposure dose threshold and other parameters enabling the normal operation of the flat-panel detector. The exposure dose threshold can be estimated based on the density, thickness, and other parameters of a current photographed object, and methods for estimating the exposure dose threshold may be selected as needed. After the flat-panel detector is turned on and preheated, one or more exposure radiation fields of the flat-panel detector are selected. The exposure radiation fields adopt a three-field mode, a five-field mode, any-number-of-fields AEC mode, or a full-panel AEC mode. The full-panel AEC mode is configured such that any position on the full panel is able to be used as one of the exposure radiation fields, and the exposure radiation field to be tested is determined by the flat-panel detector based on a current shooting position. In the present disclosure, the exposure radiation fields may adopt one of the above-listed modes as needed for use.

Step 2: testing a corresponding exposure dose obtained by scanning the exposure radiation fields of the flat-panel detector in real time, and determining that an exposure has started in response to determining the tested exposure dose is greater than a first preset threshold.

Specifically, a starting moment of the exposure is determined based on the tested exposure dose. More specifically, an exposure window of the flat-panel detector is opened after step 1, then the flat-panel detector enters an integration state, scans the exposure radiation fields of the flat-panel detector, obtains an exposure dose rate (i.e., a current exposure dose) based on gray values of the image within the exposure radiation fields, and finally obtains an exposure dose by integrating the exposure dose rate. If the obtained exposure dose is tested to be greater than the first preset threshold, it is determined that an exposure has started and the flat-panel detector is configured to send out an exposure start signal. The first preset threshold is greater than or equal to zero.

Step 3: configuring the flat-panel detector such that it enters an automatic exposure control mode in response to determining the exposure is started and triggers a cut-off signal.

Specifically, the flat-panel detector opens the exposure window and enters an integrated digital automatic exposure control mode in response to determining the exposure start signal is active. As an example, the flat-panel detector scans the exposure radiation fields, obtains the exposure dose rate based on the gray values of the image within the exposure radiation fields, then obtains a corresponding exposure dose in real time by integrating the exposure dose rate over time, and sends out the cut-off signal in response to determining the corresponding exposure dose reaches an exposure dose threshold. As another example shown in FIG. 1, the flat-panel detector scans the exposure radiation fields, obtains the exposure dose rate based on the gray values of the image within the exposure radiation fields, and finally obtains the corresponding exposure dose in real time by integrating the exposure dose rate. Then, the flat-panel detector predicts, based on the exposure dose rate and a delay duration of a signal transmission, the corresponding exposure dose at the end of the exposure to obtain a predicted exposure dose. In the present disclosure, the exposure dose rate and the delay duration of the signal transmission are related to the predicted exposure dose. As an example, the exposure dose rate and the delay duration are positively correlated with the predicted exposure dose, that is, the greater the exposure dose rate is, the longer the delay duration is, the larger the predicted exposure dose is. The relationship between the exposure dose rate and the delay duration, and the predicted exposure dose can be set as needed. The flat-panel detector is triggered to send out the cut-off signal in response to determining the predicted exposure dose reaches the exposure dose threshold.

As yet another embodiment, the automatic X-ray exposure control method further comprises: determining, based on a logical relationship between the exposure radiation fields, whether the flat-panel detector sends out the cut-off signal. The logical relationship adopts an AND logic, an OR logic, a weighted average, etc. Specifically, the AND logic means that if and only if the exposure dose of each of the exposure radiation fields (the real-time exposure dose or predicted exposure dose) reaches the exposure dose threshold, the flat-panel detector will send out the cut-off signal. The OR logic means that if the exposure dose of any one of the exposure radiation fields (the real-time exposure dose or predicted exposure dose) reaches the exposure dose threshold, the flat-panel detector will send out the cut-off signal. The weighted average means that if an average value of the exposure doses of the exposure radiation fields which is calculated based on weights corresponding to the exposure radiation fields (the real-time exposure dose or predicted exposure dose) reaches the exposure dose threshold, the flat-panel detector will send out the cut-off signal. In practice, the actual logical relationship can be determined as needed.

It should be noted that any method that can achieve automatic exposure control is applicable to the present disclosure.

Step 4: configuring the flat-panel detector such that it triggers an image acquisition in response to determining the exposure is completed.

Specifically, a high-voltage controller is configured such that it receives the cut-off signal and cuts off a high-voltage generator device based on the cut-off signal, so that a bulb stops emitting X-rays. There exists a delay between the generation of the cut-off signal and the cessation of emitting X-rays, during which time the X-rays are still radiating and the exposure dose continues to accumulate. The exposure is completed while the X-rays no longer radiate.

More specifically, in the present disclosure, the flat-panel detector continuously scans the exposure radiation fields in real time during the delay duration, obtains the exposure dose rate based on the gray values of the image within the exposure radiation fields, determines that the exposure is completed in response to determining the obtained exposure dose rate is less than a second preset threshold, and sends out an exposure end signal. The second preset threshold is greater than zero. In practice, any automatic exposure testing method that can detect a completion of the exposure is applicable to the present disclosure. For example, exposure sensors can be utilized to realize the above automatic exposure testing method.

Specifically, the flat-panel detector closes the exposure window and triggers the image acquisition in response to determining the exposure end signal is active. As the flat-panel detector immediately performs these two operations when the exposure is completed, an actual duration of the exposure window is shorter than a preset duration of the exposure window, thus shortening the image acquisition cycle of the flat-panel detector.

It should be noted that the present disclosed automatic X-ray exposure control method and system achieve, based on the corresponding exposure dose obtained by scanning the exposure radiation fields of the flat-panel detector, automatic exposure testing without relying on external trigger signals or a sensor, resulting in a simpler structure and lower cost. It can predict the corresponding exposure dose at the end of the exposure through an algorithm, which effectively avoids exposure dose errors 9 caused by line delays and other problems, enabling accurate exposure control and improved imaging quality. The flat-panel detector immediately closes the exposure window and triggers the image acquisition when the exposure is completed, thus shortening the image acquisition cycle of the flat-panel detector. The operator is only required to start the high-voltage generator throughout the exposure and image acquisition, greatly reducing the complexity of operation.

Embodiment 2

Figure 2:
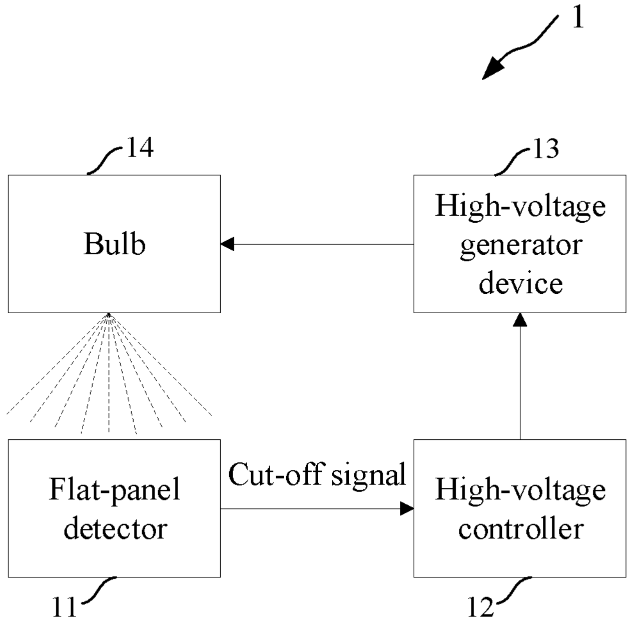
FIG. 2 shows a schematic structural diagram of an automatic X-ray exposure control system according to the present disclosure.
Figure 3:
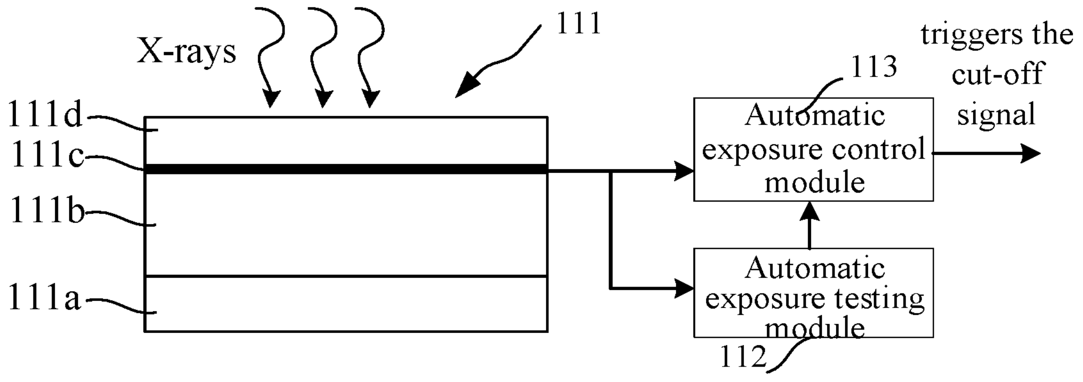
FIG. 3 shows a schematic structural diagram of a flat-panel detector according to the present disclosure.
Figure 4:
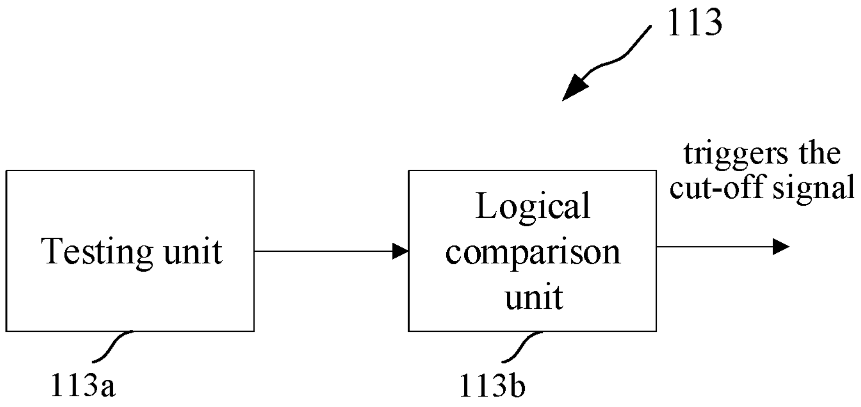
FIG. 4 shows a schematic structural diagram of an automatic exposure control module according to the present disclosure.

As shown in FIGS. 2 to 4, the present disclosure provides an automatic X-ray exposure control system 1, implementing the above-mentioned automatic X-ray exposure control method, comprising:

a flat-panel detector 11, a high-voltage controller 12, a high-voltage generator device 13, and a bulb 14.

As shown in FIG. 2, the flat-panel detector 11 is configured to implement automatic exposure control and automatically collect an image.

Specifically, as shown in FIG. 3, the flat-panel detector 11 comprises a detecting panel 111, an automatic exposure testing module 112, and an automatic exposure control module 113. The detecting panel 111 tests X-rays and converts X-rays into electrical signals. The automatic exposure testing module 112 is connected to an output terminal of the detecting panel 111, and determines a start and end of an exposure based on an output signal of the detecting panel 111. The automatic exposure control module 113 is connected to output terminals of the detecting panel 111 and the automatic exposure testing module 112 respectively, and triggers a cut-off signal based on the output signal of the detecting panel 111.

More specifically, as shown in FIG. 3, the flat-panel detector 111 may comprise an anti-back-scattering layer 111_a_ disposed on the bottom, a substrate 111_b_ disposed on the anti-back-scattering layer 111_a_, a pixel array 111_c_ prepared on the substrate 111_b_, and a scintillator 111_d_ disposed on the pixel array 111_c_. The flat-panel detector 111 can be configured based on actual needs and is not limited to the present disclosure.

As shown in FIG. 4, the automatic exposure control module 113 comprises a testing unit 113_a_ and a logical comparison unit 113_b_. The testing unit 113_a_ determines, based on the exposure dose rate, the corresponding exposure dose in real time. The logical comparison unit 113_b_ is connected to an output terminal of the testing unit 113_a_, and triggers the cut-off signal in response to determining the corresponding exposure dose reaches an exposure dose threshold. As another example, the automatic exposure control module 113 comprises a testing unit 113_a_ and a logical comparison unit 113_b_. The testing unit 113_a_ predicts, based on the exposure dose rate and a delay duration of a signal transmission, the corresponding exposure dose at the end of the 17 exposure to obtain a predicted exposure dose. The exposure dose rate and the delay duration are related to the predicted exposure dose. For example, the exposure dose rate and the delay duration are positively correlated with the predicted exposure dose. The logical comparison unit 113_b_ is connected to an output terminal of the testing unit 113_a_, and triggers the cut-off signal in response to determining the predicted exposure dose reaches an exposure dose threshold.

As yet another example, when the exposure radiation fields comprise two or more exposure radiation fields, the testing unit 113_a_ predicts the exposure dose of each of the exposure radiation fields at the end of the exposure based on the exposure dose rate of each of the exposure radiation fields and the delay duration of the signal transmission. The logical comparison unit 113_b_ performs logic operations and comparison operations on the predicted exposure dose of each of the exposure radiation fields corresponding to the end of the exposure, and triggers the cut-off signal. The logic operations comprise an AND logic, an OR logic, a weighted average, etc. As an example, the logical comparison unit 113_b_ compares the predicted exposure dose of each of the exposure radiation fields corresponding to the end of the exposure with the exposure dose threshold, respectively, to obtain a plurality of comparison results, and performs the AND logic on the plurality of the comparison results. The logical comparison unit 113_b_ triggers the cut-off signal in response to determining the predicted exposure dose of each of the exposure radiation fields corresponding to the end of the exposure reaches an exposure dose threshold. As another example, the logical comparison unit 113_b_ performs the OR logic on the plurality of the comparison results. The logical comparison unit 113_b_ triggers the cut-off signal in response to determining the predicted exposure dose of any one of the exposure radiation fields corresponding to the end of the exposure reaches an exposure dose threshold. As yet another example, the logical comparison unit 113_b_ performs weighted averaging on the plurality of the comparison results to obtain an average value of the predicted exposure doses of the exposure radiation fields which is calculated by multiplying the predicted exposure doses by weights corresponding to the exposure radiation fields. The logical comparison unit 113_b_ triggers the cut-off signal in response to determining the average value of the predicted exposure doses reaches an exposure dose threshold. Any other logic or a combination of multiple logics is applicable to the present disclosure. It should be noted that, when the exposure radiation fields comprise two or more exposure radiation fields, the testing unit 113_a_ can test the exposure dose of each of the exposure radiation fields in real time, respectively. The logical comparison unit 113_b_ performs logic operations and comparison operations on the real-time exposure dose of each of the exposure radiation fields, and triggers the cut-off signal.

As shown in FIG. 2, the high-voltage controller 12 is connected to an output terminal of the flat-panel detector 11, and controls the high-voltage generator device 13. The high-voltage controller 12 cuts off the high-voltage generator device 13 after receiving the cut-off signal from the flat-panel detector 11.

As shown in FIG. 2, the high-voltage generator device 13 is connected to an output terminal of the high-voltage controller 12, and is controlled by the high-voltage controller 12.

As shown in FIG. 2, the bulb 14 is connected to an output terminal of the high-voltage generator device 13, and starts the exposure when the high-voltage generator device 13 has generated a high voltage. The bulb 14 stops the exposure when the high-voltage generator device 13 is turned off.

In summary, the present disclosed automatic X-ray exposure control method and system comprises: turning on a flat-panel detector, setting parameters of the flat-panel 6 detector, and selecting one or more exposure radiation fields of the flat-panel detector; testing a corresponding exposure dose obtained by scanning the exposure radiation fields of the flat-panel detector in real time, and determining that an exposure has started in response to determining the tested exposure dose is greater than a first preset threshold; configuring the flat-panel detector such that it enters an automatic exposure control mode in response to determining the exposure is started and triggers a cut-off signal; configuring the flat-panel detector such that it triggers an image acquisition in response to determining the exposure is completed. The above-mentioned method and system achieve, by testing the corresponding exposure dose obtained by scanning the exposure radiation fields of the flat-panel detector, automatic exposure control without relying on external trigger signals or a sensor, resulting in a simpler structure and lower cost. By integrating the corresponding exposure dose at the end of the exposure through an algorithm, it can effectively avoid exposure dose errors caused by line delays and other problems, enabling accurate exposure control and improved imaging quality. The flat-panel detector immediately closes the exposure window and triggers the image acquisition when the exposure is completed, thus shortening the image acquisition cycle of the flat-panel detector. Throughout the exposure and image acquisition, the operator is only required to start the high-voltage generator, greatly reducing the complexity of operation. Therefore, the present disclosure effectively overcomes various shortcomings in the existing technology and has high industrial utilization value.

The above-mentioned embodiments are merely illustrative of the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the scope of the present disclosure.

The invention claimed is:

1. An automatic X-ray exposure control method, comprising:

turning on a flat-panel detector, setting parameters of the flat-panel detector, and selecting one or more exposure radiation fields of the flat-panel detector;

testing a corresponding exposure dose obtained by scanning the exposure radiation fields of the flat-panel detector in real time, and determining that an exposure has started in response to determining the tested exposure dose is greater than a first preset threshold;

configuring the flat-panel detector such that it enters an automatic exposure control mode in response to determining the exposure is started, wherein the flat-panel detector tests an exposure dose rate, determines the corresponding exposure dose in real time, predicts the corresponding exposure dose after a preset delay duration to obtain a predicted exposure dose based on the corresponding exposure dose in real time, the exposure dose rate, and the preset delay duration, and triggers a cut-off signal in response to determining the predicted exposure dose reaches an exposure dose threshold;

and configuring the flat-panel detector such that it triggers an image acquisition in response to determining the exposure is completed;

wherein the first preset threshold is greater than or equal to zero.

2. The method according to claim 1, wherein the exposure radiation fields adopt an N-fields AEC mode or a full-panel AEC mode, wherein N is a natural number.

3. The method according to claim 1, further comprising: when the exposure radiation fields comprise two or more exposure radiation fields, determining, based on a logical relationship between the exposure radiation fields, whether the flat-panel detector sends out the cut-off signal.

4. The method according to claim 3, wherein the logical relationship comprises at least one of an AND logic, an OR logic, and a weighted average.

5. The method according to claim 1, further comprising: testing the corresponding exposure dose rate obtained by scanning the exposure radiation fields of the flat-panel detector in real time, and determining that the exposure is completed in response to determining the tested exposure dose rate is less than a second preset threshold, wherein the second preset threshold is greater than zero.

6. An automatic X-ray exposure control system, implementing the method according to claim 1, comprising:

a flat-panel detector, a high-voltage controller connected to an output terminal of the flat-panel detector, a high-voltage generator device connected to an output terminal of the high-voltage controller, and a bulb connected to an output terminal of the high-voltage generator device;

wherein the flat-panel detector comprises a detecting panel, an automatic exposure testing module, and an automatic exposure control module, wherein the detecting panel tests X-rays and converts X-rays into electrical signals, wherein the automatic exposure testing module is connected to an output terminal of the detecting panel, and determines a start and end of an exposure based on an output signal of the detecting panel, wherein the automatic exposure control module is connected to output terminals of the detecting panel and the automatic exposure testing module respectively, and triggers a cut-off signal based on the output signal of the detecting panel, wherein the high-voltage controller cuts off the high-voltage generator device based on the cut-off signal, so that the bulb stops emitting X-rays.

7. The system according to claim 6, wherein the automatic exposure control module comprises a testing unit and a logical comparison unit, wherein the testing unit determines, based on the exposure dose rate, the corresponding exposure dose in real time, wherein the logical comparison unit is connected to an output terminal of the testing unit, and triggers the cut-off signal when the corresponding exposure dose reaches an exposure dose threshold.

8. The system according to claim 7, wherein when the exposure radiation fields comprise two or more exposure radiation fields, the testing unit tests each of the exposure radiation fields respectively, wherein the logical comparison unit performs logic operations and comparison operations on an output signal of the testing unit, and triggers the cut-off signal.

9. The system according to claim 6, wherein the automatic exposure control module comprises a testing unit and a logical comparison unit, wherein the testing unit predicts, based on the exposure dose rate and a delay duration of a signal transmission, the corresponding exposure dose at the end of the exposure to obtain a predicted exposure dose, wherein the logical comparison unit is connected to an output terminal of the testing unit, and triggers the cut-off signal when the predicted exposure dose reaches an exposure dose threshold.

10. The system according to claim 9, wherein when the exposure radiation fields comprise two or more exposure radiation fields, the testing unit tests each of the exposure radiation fields respectively, wherein the logical comparison unit performs logic operations and comparison operations on an output signal of the testing unit, and triggers the cut-off signal.

11. The method according to claim 1, wherein the exposure dose rate is obtained based on gray values of images within the exposure radiation fields.

12. The method according to claim 11, wherein the corresponding exposure dose in real time is obtained by integrating the exposure dose rate over time.

13. The method according to claim 1, wherein the preset delay duration is set based on line delays of signal transmission.

14. The method according to claim 1, wherein a first moment when the cut-off signal is triggered precedes a second moment when the corresponding exposure dose in real time reaches the exposure dose threshold by the preset delay duration.

* * * * *